United States Patent [19]

Brown et al.

[11] Patent Number: 4,636,397

[45] Date of Patent: Jan. 13, 1987

[54] PROCESS FOR MAKING AN IMPROVED INSTANT FILLING MIX

[75] Inventors: Catherine A. Brown, Port Hope; Jean L. Eng, Oshawa, both of Canada

[73] Assignee: General Foods Inc., Don Mills, Canada

[21] Appl. No.: 802,544

[22] Filed: Nov. 27, 1985

[51] Int. Cl.⁴ .............................................. A23L 1/187
[52] U.S. Cl. .................... 426/579; 426/658; 426/578
[58] Field of Search .................. 426/578, 579, 658

[56] References Cited

U.S. PATENT DOCUMENTS

| | | | |
|---|---|---|---|
| 3,931,423 | 1/1976 | Mitchell | 426/579 |
| 4,006,264 | 2/1977 | Smith et al. | 426/579 |
| 4,361,592 | 11/1982 | Carpenter | 426/579 |
| 4,438,148 | 3/1984 | O'Rourke et al. | 426/579 |
| 4,469,712 | 9/1984 | Katcher | 426/579 |
| 4,504,512 | 3/1985 | Danielson et al. | 426/579 |
| 4,518,622 | 5/1985 | Wilson et al. | 426/579 |

*Primary Examiner*—Jeanette Hunter
*Attorney, Agent, or Firm*—Linn I. Grim; Thomas A. Marcoux; Daniel J. Donovan

[57] ABSTRACT

A process for producing an instant starch based pie filling mix by premixing natural sweetener and fat, subsequently dry mixing remaining sweetener, starch and maltodextrin with the pre-mixed fat and sweetener until a flowable powder results. The no-bake pie filling upon hydration sets to a firm glossy, smooth and creamy texture.

12 Claims, No Drawings

1

PROCESS FOR MAKING AN IMPROVED INSTANT FILLING MIX

BACKGROUND OF THE INVENTION

The present invention relates to a process for producing an improved filling mix and on hydration without cooking or baking produces a smooth, creamy and firm texture with a sliceable pie cut characteristic on setting.

The trend requires food preparation to be of the type of instanteous use. This means that in instant pudding or instant filling preparations, these foods are prepared from a dry mix without cooking. The difficulty associated with these conveniences is that starting materials used to prepare these high quality instant foods must be carefully controlled and the tolerance of these controls are exceptionally tight wherein many of these formulations are not considered satisfactory and require recycling, reworking, etc. of the finished dry mixes increasing the costs of production.

U.S. Pat. No. 4,361,592 issued to Carpenter et al. describes a pudding mix composition which, when combined with milk produces a desirable, creamy, glossy pudding. This is accomplished using fine particles of pregelatinized starch having less than a maximum of 1% by weight of the starch having a particle diameter greater than 63 microns (i.e., retained on a 230 mesh U.S. Standard Screen). A regular starch would generally have a particle size wherein less than 50% by weight of the starch particles pass through a 400 mesh U.S. Standard Screen with a substantial amount of the starch being retained on a 230 mesh U.S. Standard Screen (e.g., greater than 10%, usually greater than 25-50% by weight of the starch). U.S. Pat. No. 4,438,148 issued to O'Rourke et al. describes the use of controlled sized finely divided starch and controlled sized finely divided sugar particles to achieve a desirable, creamy, glossy pudding while U.S. Pat. No. 4,469,712 issued to Katcher et al. claims an improved dry instant pudding mix made from controlled sized starch and sugar.

U.S. Pat. No. 2,554,143 issued to Hinz et al. teaches that finely divided starch particles can be used in an instant pudding mix, only if their rate of hydration is retarded. Hinz et al. achieve the hydration rate retardation by coating the starch with a hydrophobic rate retardation by coating the starch with a hydrophobic material such as a lipid or talc. The problem Hinz et al. recognized is that when fine starch particles hydrate, there is a tendency for these particles to lump to the point when it is quite difficult to prepare a smooth pudding product.

SUMMARY OF THE INVENTION

The present invention provides a process for making an improved instant filling mix which on reconstitution produces a highly desirable glossy, smooth and creamy and firm texture with a sliceable pie cut characteristic on setting made from standard and finely divided particles, normally sized ingredients of filling mix such as starch, sugar or other sweeteners as well as other materials. Actually special grinding of the ingredients to a specific size is not necessary for this invention but finely ground ingredients can be used, if desired.

DETAILED DESCRIPTION OF THE INVENTION

A process has been discovered for making an improved instant filling mix which on hydration produces a smooth, creamy and firm texture with a sharp pie cut characteristic on setting. The process includes the following steps:

A liquid hydrogenated or partially hydrogenated edible oil at room temperature is mixed with a large portion (about 40 to about 100%) by weight) of the solid particles of the total natural carbohydrate sweetener to be used to provide a substantially uniform oil-coated natural carbohydrate sweetener product. This product is dry mixed with the remaining solid particles of the natural carbohydrate sweetener; a rapid hydratable cold water swelling starch, preferably granular; malto-dextrin having a dextrose equivalent between about 5 to about 20; a flavor and other ingredients, if required; the mixing is continued for a period of time sufficient to obtain a substantially uniform mix of the total ingredients to provide a flowable powder.

It has been discovered in this invention that if the total or a portion of the natural carbohydrate sweetener used is mixed with a liquid hydrogenated or partially hydrogenated edible oil to provide a substantially uniformly oil coated product which is then blended with the remaining ingredients, the resulting product, on hydration, produces a smooth, creamy and firm texture with a sliceable pie cut characteristic on setting. It is preferred that about 40 to about 60% by weight of the total natural carbohydrate sweetener solid particles to be used is coated with the edible oil to provide a more uniform distribution of the ingredients on hydration. If the malto-dextrin or starch present in the mix, is added with oil prior to use with the remaining ingredients, a smooth and creamy filling will not be obtained in some instances because uniform distribution of the ingredients will not be achieved and, if a smooth and creamy filling is achieved, the set pie filling on prolonged setting will be syneresed to the point where the set will break down. To assure the smooth and creamy texture of the filling made by this invention, malto-dextrin is used to aid the uniform distribution of the ingredients on hydration. If malto-dextrin is not used, the resulting product is lumpy, grainy and not acceptable as a high quality filling mix.

The weight percentage of ingredients used in the process of this invention based on the total composition are as follows:

| Ingredients | Weight Percentage |
| --- | --- |
| natural carbohydrate sweeteners | about 55 to about 80% preferably about 60 to about 68% |
| rapid hydratable cold water swelling granular starch | about 16 to about 20% preferably about 17 to about 19% |
| malto-dextrin having a dextrose equivalent between about 5 to about 20 preferably about 9 to about 12 | about 5 to about 15% preferably about 8 to about 10% |
| edible oil | about 4 to about 6% preferably 4.5 to about 5.5% |
| flavor | below about 1% preferably about 0.2 to about 0.5% as needed |
| edible food acid | 0 to about 5% preferably |

-continued

| Ingredients | Weight Percentage |
|---|---|
| color | about 1.0 to about 1.5% as needed |

Additional ingredients, if desired, can be used in the above combination of materials to enhance taste, flavor, sweetness and whatever is needed to provide a satisfactory food product.

In this invention, the natural carbohydrate sweetener which can be used is sugar from any source available in dry granular form such as sucrose or dextrose as well as other solid sweeteners such as fructose, corn syrup solids, or mixtures thereof among other natural sweeteners. These sweeteners must be free flowing particles of suitable size to make instant mixes.

Various malto-dextrins (hydrolyzed cereal solids) which are starch hydrolysates produced by converting pure refined corn starch into nutritive saccharides through the use of acids or specific enzymes, are used in this invention. The carbohydrate composition of malto-dextrin is arranged to yield a dextrose equivalent from about 5 to about 20, preferably 7 to about 12. These are typically bland in flavor and without appreciable sweetness. This malto-dextrin is a free-flowing powder and its presence is for aiding the uniform distribution of all ingredients on hydration.

The rapid hydratable cold water swelling starch of this invention are being used as a thickening agent. These starches are obtained from a variety of starch sources such as tapioca, corn, high amylose, sweet potato, potato, waxy maize, canna, arrowroot, sorghum, waxy sorghum, waxy rice, sago rice and the like. The essential feature of the starch is that it is a rapid hydratable cold water swelling starch, preferably granular, which will set up on hydration with all the remaining ingredients present at room temperature in a reasonable time preferably in less than 2 hours and preferably less than 1 hour in a smooth, creamy and firm texture with a sliceable pie cut characteristic. The type of starches that can be used can include the types of starches described in U.S. Pat. No. 3,949,104 issued to Hsiung Cheng, among other and commercially available, cold-water swelling starches identified as NU-COL 231, NU-COL 326, NU-COL 4227, MIRA-GEL 463 (manufactured and sold by the A. E. Staley Manufacturing Company, Decatur, Ill.). The preferred starch is the MIRA-GEL 463 which is a cold water swelling starch which hydrates in water at ambient temperatures, first forming to a thick smooth consistency and then setting to a resilient colloidal gel structure. The particle size of the starch is that which is normally used in the instant pudding or pie fillings, i.e., particle size wherein 95% passes through 100 Mesh U.S. Standard Screen and at least 65% passes through a 200 mesh U.S. Standard Screen. Finer particles can be used if desired. It is essential that the size particles of the starch are such that in the combination of the other ingredients a free-flowing powder is available. The term "cold water swelling" as used herein relates to the use of water for hydration below the boiling point of water, preferably below 150° F. and more preferably below 120° F. and ideally at room temperature or ambient temperatures.

The edible oil which is used herein is a liquid at use and preferably liquid at room temperature and can be any food acceptable hydrogenated or partially hydrogenated edible oil. The preferred oils are the hydrogenated vegetable oil including, among others: coconut oil, palm kernel oil, cottonseed oil, peanut oil, soybean oil, canola oil, corn oil and mixtures thereof. The oils used herein cannot have a taste or flavor which would interfer with the desirable taste and flavor of the filling mix.

The flavors used in this invention can be any acceptable flavors. These include among others, lemon, cherry, almond, pecan, strawberry, orange, lime, blueberry, raspberry and the like.

The edible food acids which can be used include, among others, citric acid, malic acid, adipic acid, fumaric acid, tartaric acid, or mixtures thereof.

After all the ingredients have been dry mixed, prior to the hydration step, the resulting product must be a flowable powder. On hydration, the product of this invention produces, without cooking or baking, a smooth, creamy and firm texture with a sharp pie cut characteritic on setting.

The following examples are presented for the purpose of further illustrating the present invention and are not to be taken as limiting.

EXAMPLE I

No Bake Lemon Pie

| Ingredients | Weight Grams | Weight % of Total |
|---|---|---|
| Sugar | 160 | 65.6 |
| Rapid Hydratable Cold Water Swelling Granular Starch MIRA-GEL 463 (Staley) | 45 | 18.5 |
| Malto-dextrin (Lodex 10) dextrose Equivalent 10 | 22 | 9.1 |
| Hydrogenated Oil | 13 | 5.3 |
| Citric Acid | 3.0 | 1.2 |
| Lemon Flavor | 0.80 | 0.3 |
| Yellow Color | 0.02 | 0.008 |
| Total | 243.8 | 100 |

Mixing procedure: 80 grams of regular table sized sugar were mixed and coated with all of the hydrogenated corn oil until the sugar was substantially uniformly coated with the oil.

The remaining 80 grams sugar, 45 grams rapid hydratable cold water swelling granular starch, 22 grams malto-dextrin, 3 grams citric acid, 0.8 grams lemon flavor and 0.02 grams yellow color were mixed with the substantially uniformly oil coated sugar above for 15 minutes to produce a flowable powder product. In a mixer containing 2 cups of hot water at 120° F., where the beaters are immersed in the water and rotating, 243.8 grams of the above flowable powder product was slowly sprinkled on top of the water until all the product was added. The mixing continued until the product mixture was smooth and lump free. One tablespoon of melted butter was added and it was further mixed for 2 minutes. The resulting product was poured into a container and allowed to set up for 45 minutes. The product had a smooth, creamy and firm texture with a sliceable pie cut characteristic on setting.

EXAMPLE II

The process of Example I was repeated except the oil was coated on all the sugar used prior to mixing of the remaining ingredients. All ingredients were dry mixed for 15 minutes. The mixture was sprinkled into two cups of hot water about 120° F. and mixed until the mixture was smooth. Two egg yolks and 1 tablespoon of melted butter were added to add body and again mixed. This product was poured into a pie plate and allowed to set. A smooth, creamy pie filling with a sliceable cut edge resulted after one hour.

EXAMPLE III

The process of Example I was repeated except the hydrogenated vegetable oil was mixed with the malto-dextrin. The starch was added to the oiled malto-dextrin and mixed thoroughly. The remaining dry ingredients were added to the oiled malto-dextrin and starch and mixed for 15 minutes. The resulting product was added to 2 cups of hot water (120° F.) and mixed until smooth. Two egg yolks and one tablespoon of melted butter, used to add body, were added to the mixture and mixed again. The mixture was poured into a pie plate and set in one hour. The filling was smooth and creamy, however, on prolonged sitting, the product syneresed to the point where the set broke down.

EXAMPLE IV

The procedure of Example III was repeated except the starch was mixed with hydrogenated vegetable oil and the remaining ingredients were dry mixed with the oiled starch. The result of this example was similar to that of Example III that being a smooth product but the break down in set occurred on prolonged sitting.

EXAMPLE V

The process of Example I was repeated with the exception that malto-dextrin was not used. All ingredients were mixed and the resulting product was added to two cups of hot water (120° F.) and thoroughly mixed until smooth. Two egg yolks and one tablespoon of melted butter, to add body, were added and again mixed. The product was poured into a pie plate and setting occurred in one hour. The surface and texture of the filling had a very fine grittiness throughout the set product. This is not considered a high quality product.

In all of the above examples, the melted butter and egg yolks had no effect in obtaining a smooth, creamy filling with a sliceable cut edge.

The above disclosure has provided a description of the invention for the purpose of enabling the person skilled in the art how to make and use the same and has not been made for the purpose of detailing all things known or obvious to the skilled worker. Upon reading this disclosure, many modifications and variations be included within the scope of the present invention which is defined by the following claims.

We claim:

1. A method for making an improved instant filling comprising the steps of:
    (a) mixing a liquid hydrogenated or partially hydrogenated edible oil with about 40 to about 100 percent by weight of the total natural carbohydrate sweetener solid particles to be used, to provide a substantially uniformly oil-coated natural carbohydrate sweetener product;
    (b) dry mixing the remaining natural carbohydrate sweetener solid particles, a rapid hydratable cold water swelling starch, malto-dextrin having a dextrose equivalent between about 5 to about 20 and a flavor with the product of step (a) for a period of time sufficient to obtain a substantially uniform mix of the total ingredients of steps (a) and (b) to provide a flowable powder wherein the weight percentage of ingredients, based on the total composition, comprising:
    Natural Carbohydrate Sweeteners: about 55 to about 80%
    Rapid Hydratable cold water swelling Granular Starch: about 16 to about 20%
    Malto-dextrin: about 5 to about 15%
    Edible Oil: about 4 to about 6%
    Flavor: in amounts below about 1%
    Edible Food Acid: 0 to about 5%.

2. The process of claim 1 in step (A) wherein the liquid hydrogenated edible oil is present with about 40 to about 60 percent by weight of the total natural carbohydrate sweetener solid particles to be used.

3. The process of claim 2 wherein the natural carbohydrate sweetener are particles of sucrose, fructose, corn syrup solids, dextrose, invert sugars and L-sugars or mixtures thereof.

4. The process of claim 3 wherein the malto-dextrin has a dextrose equivalent to about 7 to about 12.

5. The process of claim 4 wherein the edible oil is a hydrogenated vegetable oil selected from the group consisting of coconut oil, palm kernel oil, cottonseed oil, peanut oil and corn oil or mixtures thereof.

6. The process of claim 5 wherein the flavor is selected from the group consisting of lemon, cherry, almond, pecan, strawberry, orange, lime, blueberry and raspberry.

7. The process of claim 6 wherein the edible food acid is selected from the group consisting of citric, malic, adipic, fumaric, tartaric acids or mixtures thereof.

8. The process of claim 1 wherein the weight percentage of the ingredients are presented based on total composition in the following manner:

| Ingredients | Amounts |
| --- | --- |
| Sugar | about 60 to about 68% |
| Rapid Hydratable Cold Water Swelling Granular Starch | about 17 to about 19% |
| Malto-dextrin having a dextrose Equivalent of 10 | about 8 to about 10% |
| Hydrogenated Vegetable Oil | about 4.5 to about 5.5% |
| Lemon Flavor | about 0.2 to about 0.5% |
| Citric Acid | about 1.0 to about 1.5% |

9. The composition of claim 1.

10. The composition of claim 8.

11. The hydrated no bake composition of claim 9 used as a pie filling.

12. The hydrated no-bake composition of claim 10 used as a pie filling.

* * * * *